Figure 1:
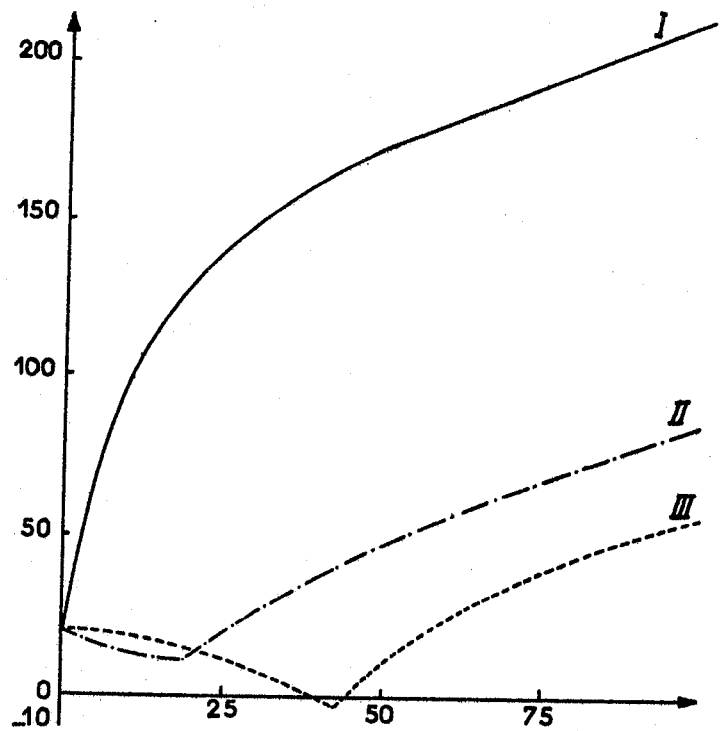

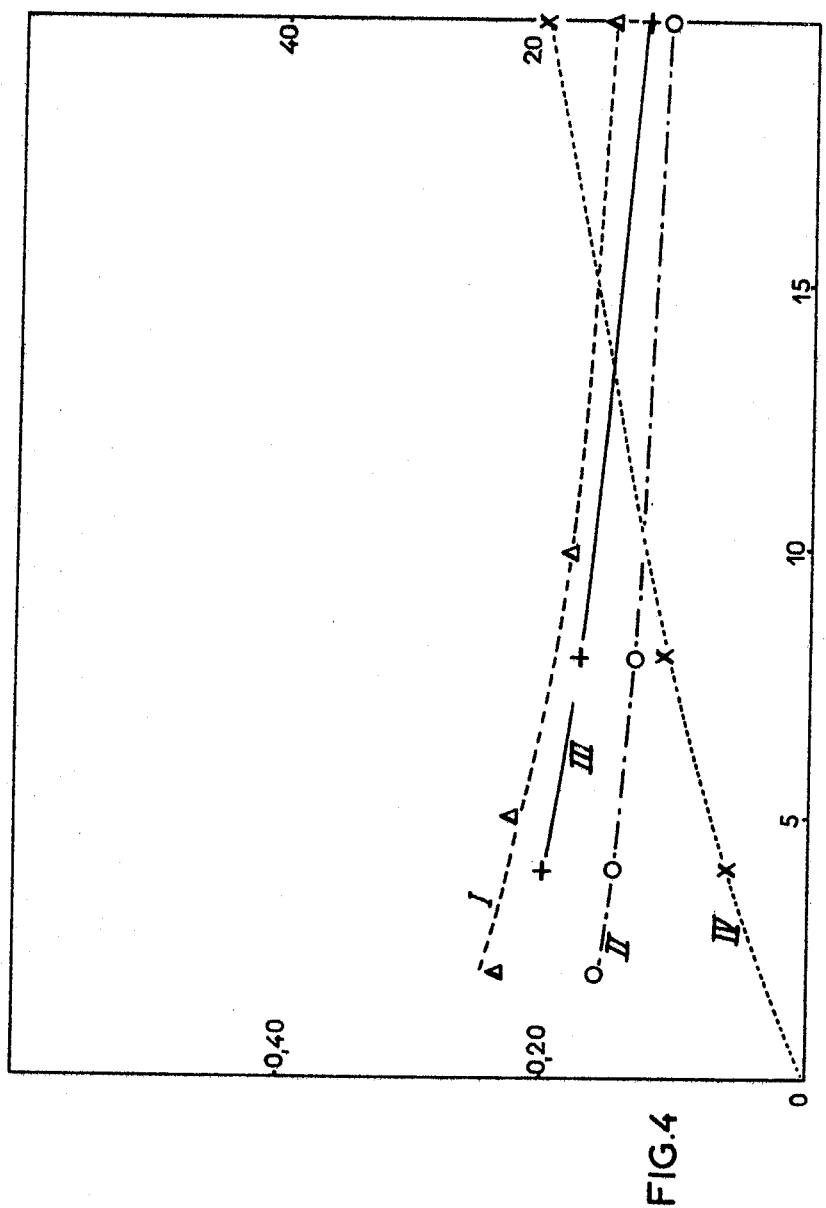

United States Patent Office 3,331,778
Patented July 18, 1967

3,331,778
ORGANIC FLUIDS FOR UTILIZATION IN NUCLEAR REACTORS
Pierre Giuliani, Grenoble, Isere, France, assignor to Institut Francais du Petrole, des Carburants, et Lubrifiants, Malmaison, and Commissariat à l'Energie Atomique, Paris, France
Filed June 18, 1964, Ser. No. 376,188
Claims priority, application France, June 28, 1963, 939,668
4 Claims. (Cl. 252—73)

The present invention relates to organic fluids which are suitable for use in nuclear reactors either as heat-transfer fluids or as neutron-moderating or reflecting fluids.

The utilization of organic fluids in nuclear reactors offers substantial advantages, whether such fluids are employed as heat-transporting media or for neutron-moderating or neutron-reflecting purposes. Among the advantages offered by these fluids can be mentioned their excellent neutron-moderating properties, low neutron capture cross-section, high boiling points compared with water, low vapor pressure at high temperatures, thereby permitting the possibility of operating at relatively low pressures, zero corrosive action on metals of the types which are usually employed in the construction of reactors, negligible induced activation under neutron radiation.

In order that organic fluids may be permitted to come into widespread use in nuclear reactors, either as heat-transfer fluids or as neutron-moderating or reflecting fluids, a certain number of conditions would first have to be satisfied. In particular, they would have to have good radiolytic and thermal stability, a low melting point and a high boiling point, as well as being inexpensive to produce.

While it has in fact proved possible by means of polyphenyls such as the triphenyls to provide organic fluids which remain stable under radiolytic and pyrolytic action, such fluids are nevertheless solid at ambient temperature, which makes it necessary to take precautions in order to prevent solidification of the fluid within the reactor as well as within the ancillary elements such as ducting, pumps and so forth. Provision therefor has to be made for preheating the different elements of the coolant circulation systems. And, in addition, triphenyls are expensive to produce.

In order to lower the melting point of these hydrocarbons, various solutions have been tried such as those outlined hereunder:

Substitution of an aliphatic chain on the benzene nucleus, which is the method already employed for the preparation and utilization of the monoisopropyldiphenyls, the mono-methyldiphenyls, the monomethyltriphenyls. However, these substitutions lower the radiolytic and thermal stability of substances in an appreciable manner and to an increasing extent as the chain is longer and the substitutions are more numerous. Their utilization is accordingly facilitated in the field of high temperatures.

Production of binary and ternary mixtures with unsubstituted aromatics, but the lowering of the melting point is never sufficient to obtain a liquid product at ambient temperature.

Production of mixtures with synthesis alkyl aromatics such as methyldiphenyls, mono-isopropyldiphenyls; however, these mixtures are very costly.

The present invention circumvents the disadvantages noted above by proposing an organic fluid which can be utilized in a nuclear reactor either as a heat-transporting fluid or as a neutron-moderating or reflecting fluid, the said fluid being liquid at ordinary temperature and having excellent radiolytic and pyrolytic stability, the radiolytic stability thereof being even better than that of the triphenyls, the said fluid being in addition inexpensive to produce.

The present invention is directed to the utilization within a nuclear reactor, either as heat transfer fluid, neutron-moderating fluid or neutron-reflecting fluid, of a mixture of unsubstituted triphenyls with short-chain alkyl aromatics derived from the production of petroleum.

The triphenyl employed is, for example, a triphenyl of the OM2 type which is at present in use as organic coolant in reactors of the Orgel type and has the following composition: meta-triphenyl, 70–80%; ortho-triphenyl, 15–20%; para-triphenyl, 3–5%. Its melting point is in the vicinity of 80° C.

The alkyl phenanthrene cuts are derived from catalytic reforming residues and are characterized by:

Absence of impurities which makes them similar to a synthesis product,

An aromatic hydrocarbon content in the vicinity of 100,

The presence among the substituted compounds of products which are almost exclusively methylated.

The above-mentioned cuts are obtained either by direct distillation or by distillation followed by a dealkylation treatment. Their radiolytic and thermal stability are satisfactory when they correspond to the following characteristics:

Boiling range, A.S.T.M.:
- Pt. I ° C. ------------------------------ >320
- Pt. F ° C. ------------------------------ <370
- Density $d_4^{25}$ -------------------------- >1.070
- Refraction index $n_{20}^d$ ------------------ >1.660
- Molecular weight ------------------------ ([1])
- Percent $H_2$ in aromatic nuclei ----------- >60
- Percent phenanthrene nuclei ------------- >45
- Percent $CH_3$ in aromatic nuclei ---------- <15
- Number $CH_3$/molecule ------------------- <1.50
- Number long chain/molecule -------------- <0.20
- Atomic ratio C/H ------------------------ >1.10

[1] Comprised between 185 and 205.

We have chosen two examples of alkyl phenanthrene cuts, these latter being designated hereinafter as AKP3 and AKP6. The said cuts had the following characteristics:

COMPOSITION

| | AKP3 | AKP6 |
|---|---|---|
| Percent phenanthrene nuclei | 48 | 52 |
| Percent anthracene nuclei | 3.5 | 3.3 |
| Percent pyrene nuclei | 6 | 3.7 |
| Percent benzanthracene nuclei | 4 | 3.6 |
| Percent —CH= | 47 | 49 |
| Percent —CH$_2$ and —CH$_3$ | 12 | 11.18 |

An activation analysis has given the following impurity contents:

| In p.p.m. | AKP3 | AKP6 |
|---|---|---|
| Na | 0.25 | 0.03 |
| Cu | 0.12 | 0.04 |
| Mn | 0.01 | 0.005 |
| Hg | 0.02 | 0.05 |
| Cl | 1 | 1.5 |
| S | 8 to 15 | 8 to 15 |

PHYSICAL CHARACTERISTICS

|  | AKP3 | AKP6 |
|---|---|---|
| Temperatures of distillation at atmospheric pressure, °C | 336–367 | 332–351 |
| Density, $d_4^{25}$ | 1.082 | 1.078 |
| Refraction index $n_d^{25}$ | 1.668 | 1.666 |
| Viscosity in cst.: |  |  |
| 25° C | 38.5 | 30.2 |
| 50° C | 8.5 | 8.4 |
| 90° C | 2.7 | 2.8 |
| Flash point ° C | 184 | 189 |
| Burning point ° C | 208 | 215 |
| Molecular weight | 200 | 200 |
| Melting point, ° C | 18 | 25 |

NOTE.—cst.=centistoke.

THERMAL STABILITY

|  | Temperature in ° C. | Time in hours | AKP3 | AKP6 |
|---|---|---|---|---|
| Percent by weight: |  |  |  |  |
| Monomer | 380 | 8 | 3.2 | 0.7 |
| Transformed | 400 | 8 | 6.3 | 1.3 |
|  | 420 | 8 | 19 | 7.8 |
| Moles of gas/moles of product | 380 | 8 | None | None |
|  | 400 | 8 | 0.013 | None |
|  | 420 | 8 | 0.0165 | None |

Radiolytic stability expressed by the radiochemical g, namely the number of molecules transformed in respect of 100 eV absorbed

| Total absorbed dose in watt/hr./g. | AKP3 | AKP6 |
|---|---|---|
| 2 | 0.19 | 0.16 |
| 4 | 0.18 | 0.14 |
| 8 | 0.16 | 0.13 |
| 20 | 0.11 | 0.11 |

The compositions and characteristics of the above products are given solely by way of indication and can of course be modified.

The radiolytic and thermal stability of these alkyl phenanthrene cuts are very good and their radiolytic stability is even better than that of the triphenyls, as a subsequent example will show.

The mixtures obtained have the same boiling range as the triphenyls while being entirely liquid at ambient temperature. These mixtures are also characterized by higher radiolytic stability than the triphenyls.

The proportions of the constituents of the mixtures will vary as a function of the melting point and of the radiolytic and pyrolytic stabilities which it is desired to obtain.

There now follow below a few examples in which consideration will be given first to the curves of crystallization and thermal stability of the alkyl phenanthrene cuts AKP3 and AKP6 as a function of the percentage of triphenyl OM2 contained therein, then to the curves of radiolytic stability of a predetermined mixture in accordance with the invention as a function of the total dose of radiation absorbed.

EXAMPLE I

FIG. 1 shows the curves of the points of crystallization obtained from the mixture of the alkyl phenanthrene cut AKP3 and the three isomers ortho, meta and para-triphenyl. Triphenyl percentages have been plotted as abscissae and temperatures have been plotted as ordinates. Curves I, II and III correspond respectively to the curves obtained in the case of para, meta and ortho-triphenyl.

It can be seen that, in the case of ortho-triphenyl, the curve passes through a minimum which corresponds to a temperature of −4.5° C. in respect of 43% ortho. This minimum is at 10° C. in respect of 20% meta-triphenyl. There is no minimum in the case of para-triphenyl.

EXAMPLE II

Figure 2:
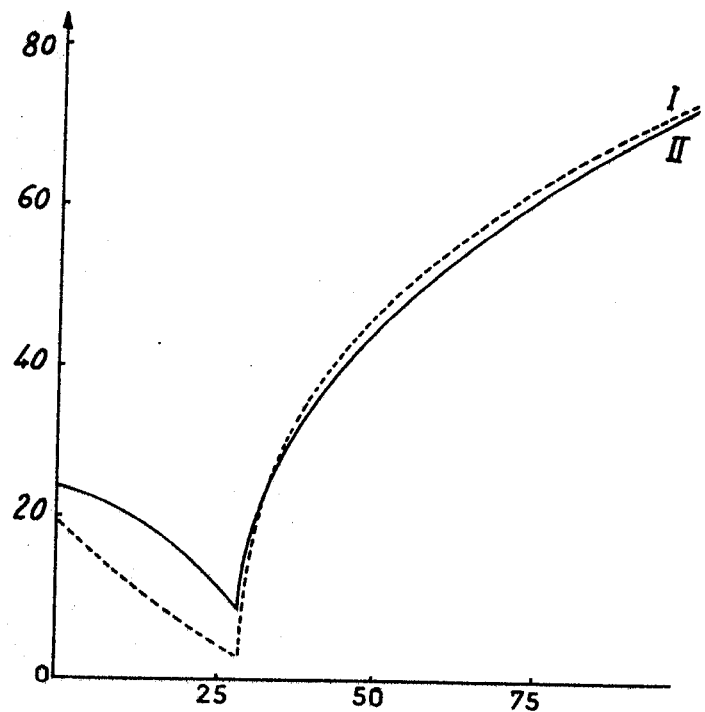

FIG. 2 shows the curves of the points of crystallization which are obtained from mixtures of triphenyl OM2 and alkyl phenanthrene cuts AKP3 and AKP6. The percentage of OM2 has been shown as abscissae and the temperatures as ordinates. Curve I is the curve corresponding to AKP3, curve II is the curve which corresponds to AKP6.

As can be seen, these curves are very similar and a minimum is obtained which corresponds in both cases to approximately 28% triphenyl and is located at 2° C. in the case of AKP3 and at 9° C. in the case of AKP6.

EXAMPLE III

Mixtures of alkyl phenanthrene cuts AKP3 and AKP6 have been carried out with increasing quantities of triphenyl OM2 for the purpose of studying their thermal stability. To this end, mixtures have been heated for a period of 8 hours at 420° C. in an inert atmosphere in autoclaves having a volume of 100 cubic centimeters and placed within a thermostatically controlled furnace.

Figure 3:
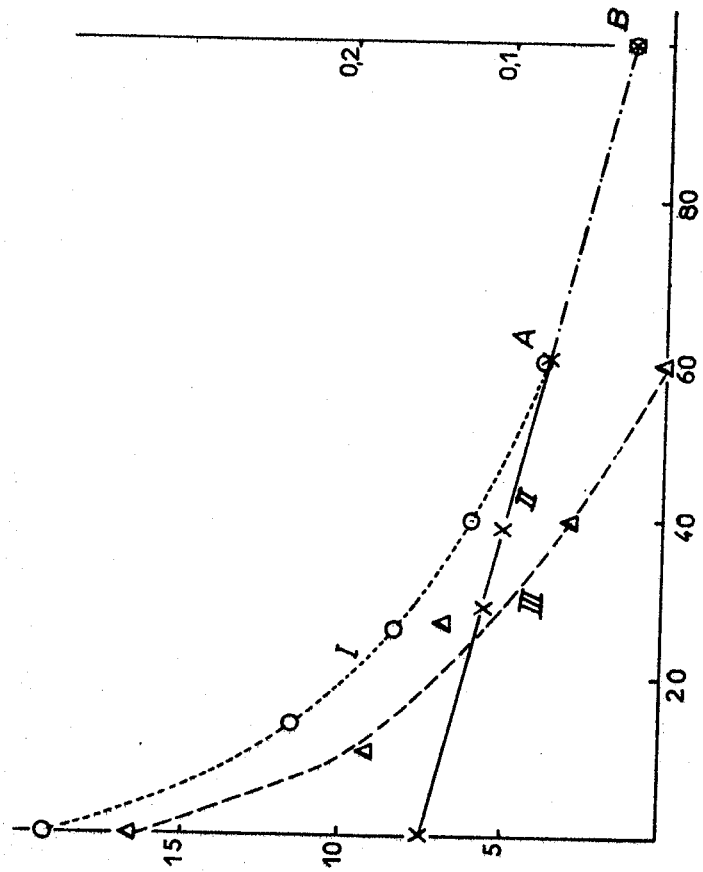

FIG. 3, in which there have been plotted as abscissae the percentages of OM2 and on the axis of the ordinates respectively the percentages of polymer formed and the ratio of gas molecules formed to the molecules of product, shows the variations in the quantity of polymers and of gas formed during these tests.

In the case of the mixture of the alkyl phenanthrene cut AKP3 with the triphenyl OM2, there can be observed in curve I a very rapid reduction in the quantity of polymers formed for a small addition of triphenyl OM2 in the alkyl phenanthrene cut. Accordingly, as a result of the replacement of 25% of alkyl phenanthrene AKP3 by triphenyl OM2, the quantity of polymers is reduced by 50%. However, this reduction is less marked in the case of the mixture of the alkyl phenanthrene cut AKP6 with the triphenyl OM2 and, as can be seen from curve II, this reduction is substantially of the same value as that of the percentage of added triphenyl OM2.

It should be noted that curves I and II meet at the point A which corresponds to a content of OM2 of 60% and then coincide in a straight line AB.

The difference in behavior of these two alkyl phenanthrene cuts is very probably due to the presence of a larger quantity of methyl groups in the alkyl phenanthrene cut AKP3.

Curve III shows the development of the ratio $$\frac{\text{gas mole}}{\text{product mole}}$$

of the mixture AKP3+OM2 as a function of the composition, and it will be observed that this ratio decreases very rapidly as the OM2 content increases.

EXAMPLE IV

The radiolytic stability of mixtures of triphenyl OM2 with cuts of alkyl phenanthrene have been studied in the case of a mixture containing 28% triphenyl OM2 and 72% alkyl phenanthrene cut AKP6.

FIG. 4 represents in the case of this mixture as well as in the case of OM2 and AKP6, the transformed monomer G, namely the number of initial molecules transformed, and the percentages of polymer formed as a function of the total absorbed radiation dose expressed in watt/hr./g. during tests carried out in statics with accelerated electrons of 600 kev. at 150° C.

Curves I, II, III correspond respectively to the curves obtained in the case of pure OM2 and AKP6, the mixture of AKP6 and OM2 in the proportions indicated above, the absorbed doses expressed in W/hr./g. being shown as abscissae and the number of initial molecules transformed being shown as ordinates. Curve IV is the curve obtained in the case of the same mixture of AKP6 and OM2 wherein the absorbed doses expressed in W/ hr./g. are shown as abscissae and the percentages of polymer formed are shown as ordinates.

The results obtained in the case of the mixture of triphenyl OM2 and AKP6 are located between those obtained in the case of OM2 and AKP6.

What we claim is:

1. A fluid for utilization in nuclear reactors as a heat-transfer medium, neutron-moderating or neutron-reflecting medium said fluid consisting essentially of a mixture of the following ingredients:
    (a) at least 28% unsubstituted triphenyls and
    (b) a phenanthrene cut derived from catalytic reforming residues, said cut being comprised of a mixture of lower alkyl substituted polynuclear aromatic compounds having at least three fused rings and an average molecular weight of from 185 to 205, wherein the major polynuclear aromatic compound of said mixture is a lower alkyl substituted phenanthrene compound, said phenanthrene cut being present in such amount so as to provide a fluid which is liquid at room temperature.

2. A fluid according to claim 1 wherein methyl is the major lower alkyl substituent of the lower alkyl substituted phenanthrene.

3. A fluid according to claim 1 wherein the mixture (b) is essentially composed of lower alkyl substituted poly-nuclear aromatic hydrocarbon compounds having phenanthrene, anthracene, pyrene and benzanthracene nuclei.

4. A fluid according to claim 1 wherein the mixture (b) has the following characteristics:

| Boiling range, A.S.T.M.: | |
|---|---|
| Pt I, ° C. | >320 |
| Pt F, ° C. | <370 |
| Density $d_4^{25}$ | >1.070 |
| Refraction index $n_{20}^d$ | >1.660 |
| Molecular weight | (¹) |
| Percent $H_2$ in aromatic nuclei | >60 |
| Percent phenanthrene nuclei | >45 |
| Percent $CH_3$ in aromatic nuclei | <15 |
| Number $CH_3$/molecule | <1.50 |
| Number long chain/molecule | <0.20 |
| Atomic ratio C/H | >1.10 |

¹ Comprised between 185 and 205.

References Cited

UNITED STATES PATENTS 2,485,103  10/1949  Mapes et al. _____ 252—73 X
3,113,090  12/1963  Ort et al. _____ 252—73 X LEON D. ROSDOL, *Primary Examiner.*

R. D. LOVERING, S. D. SCHWARTZ,
*Assistant Examiners.*